United States Patent
Afkhami et al.

(10) Patent No.: US 9,461,705 B2
(45) Date of Patent: Oct. 4, 2016

(54) POWER BACK-OFF FOR LIMITING EMISSIONS AND POWER CONSUMPTION

(71) Applicant: QUALCOMM Incorporated, San Diego, CA (US)

(72) Inventors: Hassan Kaywan Afkhami, Ocala, FL (US); Purva Rameshchandra Rajkotia, Orlando, FL (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 14/553,728

(22) Filed: Nov. 25, 2014

(65) Prior Publication Data

US 2016/0149615 A1    May 26, 2016

(51) Int. Cl.
| | | |
|---|---|---|
| H04B 3/00 | (2006.01) | |
| H04B 3/54 | (2006.01) | |
| H04L 12/26 | (2006.01) | |
| H04L 12/24 | (2006.01) | |

(52) U.S. Cl.
CPC ............. *H04B 3/54* (2013.01); *H04L 41/0823* (2013.01); *H04L 43/065* (2013.01)

(58) Field of Classification Search
CPC ............... H04L 67/10; H04L 47/6215; H04L 47/2408; H04L 67/101; H04L 12/2838; H04L 41/147; H04L 41/5035; H04L 41/5038; H04L 43/00; H04L 47/822; H04L 2025/03426; H04L 67/322; H04W 72/085; H04W 88/06; H04W 84/12; H04W 24/08; H04W 36/0066; H04W 28/0268; H04W 72/04; H04W 84/00

USPC .............. 375/260, 346, 257; 370/252, 236.1, 370/486; 455/522, 402, 63.1
See application file for complete search history.

(56) References Cited

U.S. PATENT DOCUMENTS

| | | | |
|---|---|---|---|
| 6,985,456 B2 | 1/2006 | Gaskill et al. | |
| 7,804,763 B2 | 9/2010 | Berkman et al. | |
| 7,885,633 B2 | 2/2011 | Schwager et al. | |
| 8,537,705 B2 | 9/2013 | Afkhamie et al. | |
| 8,619,563 B2 * | 12/2013 | Madan | H04L 5/0037 370/230 |
| 2006/0165117 A1 * | 7/2006 | Iwamura | H04B 3/54 370/464 |

OTHER PUBLICATIONS

Rickard, et al., "A Pragmatic Approach to Setting Limits to Radiation from Powerline Communications Systems", Mar. 1999, 10 pages.

* cited by examiner

*Primary Examiner* — Rahel Guarino

(74) *Attorney, Agent, or Firm* — DeLizio Law, PLLC

(57) ABSTRACT

Powerline communication (PLC) networks allow devices within a home, automobile, or other systems to communicate over existing wired powerline infrastructure. Active PLC networks can affect devices sharing the powerline infrastructure as well as wireless devices through radiated noise emissions. Provided in the present disclosure are exemplary techniques for reducing noise emissions and promoting coexistence of multiple PLC systems and/or non-PLC (e.g., wireless) systems.

30 Claims, 6 Drawing Sheets

POWER BACK-OFF FOR LIMITING EMISSIONS AND POWER CONSUMPTION

BACKGROUND

1. Field of the Disclosure

The present application generally relates to powerline communication (PLC) and, more specifically, to systems and methods for limiting noise emissions and reducing transmission power associated with powerline communication networks.

2. Description of Related Art

Powerline communication networks use existing powerline infrastructure (e.g., the power lines within a home, automobile, or even across multiple homes) to send signals between PLC devices or nodes. For example, a powerline communication network can supplement a home's wired (e.g., Ethernet) and wireless (e.g., WiFi) networks. The bandwidth of powerline communication networks has greatly increased in recent times. For example, some PLC channels are now capable of delivering one gigabit per second (Gbps) speeds, which are sufficient for multiple HD video streams. As a result, powerline communication networks are becoming increasingly practical and prevalent.

Currently, PLC devices typically transmit at maximum power levels, as established by either the local regulatory domain or by the physical characteristics of the transmission medium and the PLC devices' transceivers. As an example of the latter case, PLC devices on a network may reduce transmission power levels when the transmission medium has low attenuation, and when the reduction would result in better performance (e.g., due to better dynamic range properties of the resulting PLC signal).

SUMMARY

A powerline communication network having devices transmitting at maximum power levels can affect other powerline communication networks and non-PLC networks sharing the powerline infrastructure (e.g., electrical wiring of a home). Furthermore, the electrical wiring can serve as antennas that generate significant radio frequency (RF) emissions (e.g., noise) affecting wireless devices. Disclosed are techniques for reducing these emissions as well as potentially increasing the energy efficiency of powerline communication networks.

Instead of using the maximum allowable transmission power, the disclosed techniques provide for reducing transmission power to a minimal level sufficient to achieve a desired rate of communication for each application. In some scenarios, the cost of reducing transmission power is increasing the transmission time required for transmitting a set amount of information (e.g., a frame). Accordingly, when a PLC device's transmission power is decreased in these scenarios, the PLC device may spend relatively more time transmitting on the transmission medium, which increases network utilization. In other scenarios involving fixed rate communications, such as when using a robust orthogonal frequency division multiplexing (OFDM) mode (ROBO mode), transmission power may be decreased without increasing transmission time or network utilization.

A target network utilization may be established based, at least in part, on Quality of Service (QoS) requirements for the powerline communication network and the nodes and channels within the powerline communication network. When the actual network utilization is below the target network utilization, the transmission power of one or more nodes (e.g., PLC devices) may be decreased. This is called power back-off, and the back-off levels of each of the nodes can be set and stored by a network coordination processor.

In some low priority applications, such as those classified as having best-effort traffic, the desired rate of communication may be very low. A minimum throughput threshold or a maximum power back-off threshold may be established such that individual nodes do not excessively consume channel capacity by spending too much time on the transmission medium.

BRIEF DESCRIPTION OF DRAWINGS

Features, aspects, and embodiments of the disclosure are described in conjunction with the attached drawings, in which.

Figure 1:
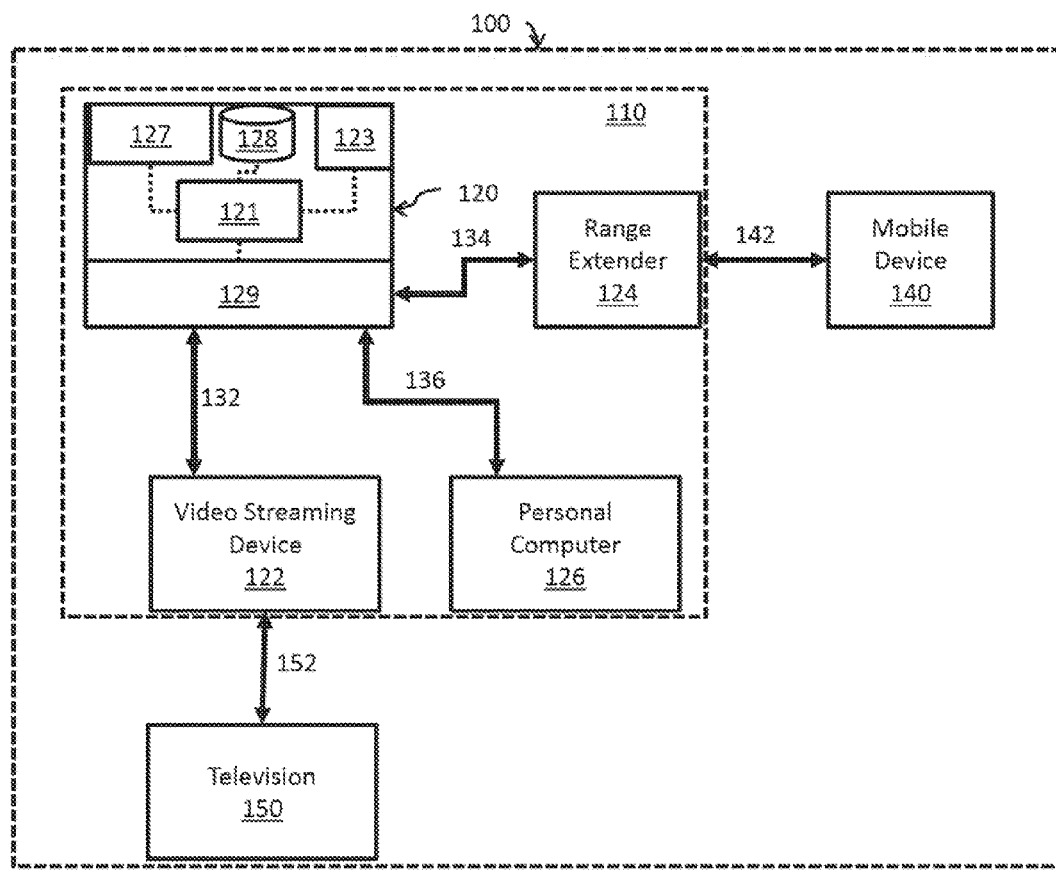
FIG. 1 shows a block diagram illustrating a system for communicating between powerline communication nodes.

These exemplary figures and embodiments are to provide a written, detailed description of the subject matter set forth by any claims that issue from the present application. These exemplary figures and embodiments should not be used to limit the scope of any such claims.

Further, although similar reference numerals may be used to refer to similar structures for convenience, each of the various example embodiments may be considered to be distinct variations.

DESCRIPTION OF EMBODIMENT(S)

FIG. 1 shows a block diagram illustrating a system 100 for communicating between powerline communication nodes. The system 100 includes elements traditionally found in a home environment, though the disclosed principles may be applied to powerline communication (PLC) networks deployed in a work place, automobile, or other environment having a powerline infrastructure. The system 100 may comprise an access point 120 that receives connectivity to an external, broader network (e.g., the internet) via a port 127. The connectivity to the external, broader network may be established via a wired connection or a wireless connection, which may use a cellular protocol such as a 2G, 3G, or 4G LTE protocol. The access point 120 may, for example, be an internet gateway router that may comprise a wireless transceiver 123 to provide wireless connectivity (e.g., WiFi) to local devices in addition to the PLC connectivity described below. The access point 120 may additionally or alternatively comprise a wired transceiver (not shown) to provide wired connectivity (e.g., Ethernet) to local devices. In some embodiments, the access point 120 may utilize HomePlug Access Broadband Power Line (BPL) protocols for coupling to a broadband backhaul network using the wiring of a public powerline infrastructure. HomePlug is a registered trademark of the HomePlug Powerline Alliance.

The access point 120 may have a PLC modem 129 that enables it to transmit and receive messages over a plurality of PLC channels 132, 136, 134, forming a PLC network 110. The PLC network 110 may utilize an existing powerline infrastructure, and communications within the PLC network 110 may be implemented using a PLC protocol such as the HomePlug 1.0, HomePlug AV2, or the HomePlug Green PHY protocols.

The access point 120 may communicate with a video streaming device 122 via the channel 132. The video streaming device 122 may deliver video to a television 150 via a wired or wireless channel 152 (e.g., a non-PLC channel). Video streaming applications typically require high bandwidth, such as 100 megabits per second (Mbps), and high Quality of Service (QoS) requirements compared to other PLC applications.

The access point 120 may further communicate with a range extender 124 via the PLC channel 134. The range extender 124 may serve to extend the range of the home network provided, at least in part, by the access point 120. For example, if the access point 120 provides a WiFi network having a limited range, the range extender 124 could be established at a location to extend the range of WiFi connectivity. Alternatively, the range extender 124 could provide wired connectivity at a separate location from the access point 120. As shown in FIG. 1, the range extender 124 may provide a connection 142 (e.g., WiFi) to a mobile device 140. The range extender 124 may effectively act as a bridge between the PLC network and another network (e.g., WiFi network).

The access point 120 may further communicate with a personal computer 126 via the PLC channel 136. The computer 126 may comprise or be connected to its own PLC modem that sends and receives signals on the PLC channel 136. The computer 126 may be used for a variety of applications that utilize local and/or internet connectivity including gaming, media sharing, and internet browsing.

Each node (e.g., the access point 120, the video streaming device 122, the range extender 124, and the personal computer 126) may comprise a media access control (MAC) layer and a physical (PHY) layer. The nodes may support an application that may provide and receive data to and from the channels in segments called frames. The frames may be generated by the MAC layer. A frame can encapsulate data from a higher layer, such as a data packet or a portion of a data packet, by including the higher layer data as a payload and adding control information such as a header and/or trailer (e.g., a trailing redundancy code). In some cases, a frame may be sent without encapsulating higher layer data as a payload.

A frame may have different names as it is encapsulated by the MAC layer and transferred to a physical layer for transmission over the communication medium. A MAC service data unit (MSDU) is a segment of information received by the MAC layer. The MAC layer processes the received MAC service data units and prepares them to generate MAC protocol data units (MPDUs). A MAC protocol data unit is a segment of information including a header field (e.g., with management and control information) and an optional payload field that the MAC layer has asked the physical layer to transport. A MAC protocol data unit can have any of a variety of formats based on the type of data being transmitted. A PHY protocol data unit (PPDU) refers to the modulated signal waveform representing a MAC protocol data unit that is transmitted over the power line by the physical layer.

Apart from generating MAC protocol data units from MAC service data units, the MAC layer can provide several functions including media access control, providing the required Quality of Service (QoS) for the MAC protocol data units, retransmission of corrupt information, routing, and repeating. Media access control enables nodes to share the communication medium by specifying when a node is allowed to transmit. Several types of media access control mechanisms like carrier sense multiple access with collision avoidance (CSMA/CA), centralized time division multiple access (TDMA), distributed TDMA, token based channel access, etc., can be used by the MAC. Similarly, a variety of retransmission mechanisms can also be used.

The physical layer can also use a variety of techniques to enable reliable and efficient transmission over the transmission medium (power line, coax, twisted pair, etc.). Various modulation techniques like orthogonal frequency division multiplexing (OFDM) or wavelet modulations can be used. Forward error correction (FEC) code like Viterbi codes, Reed-Solomon codes, concatenated codes, turbo codes, low density parity check codes, etc., can be employed by the physical layer to overcome errors.

Some implementations of the physical layer use OFDM modulation. In OFDM modulation, data is transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

The communication channel from one transmitter to a receiver may not be the same as the channel from another transmitter to that receiver, from that transmitter to another receiver, or the reverse channel from that receiver back to that transmitter. Channel characteristics concern how the transmitted signal is distorted, attenuated, and interfered with between the transmitter and the receiver, and may change over time. The transmitter and receiver may adjust modulation, forward error correction, etc. to maximize the efficiency in use of the medium. For multicast transmissions, this involves maximizing the successful delivery rate of data to all receivers in the multicast group. The description of FIG. 6 further provides implementation details of an exemplary communication system.

Each of the channels 132, 134, 136 may be selectively activated based upon usage by the end devices. For example, when a user (e.g., home occupant) is watching streaming content on the television 150, the channel 132 may be active. In the context of this disclosure, an active channel refers one that is regularly sending information as directed by at least one transmitter connected to the channel. But, transmitters on an active channel may not need to continuously transmit data and may instead limit their transmissions on the active channel to reserve network capacity for other active channels, as will be described further below.

The channels 132, 134, and 136 may be electrically coupled to one another. For example, each of the channels 132, 134, and 136 may be formed within the powerline infrastructure of a home. While a transformer may be used to isolate different electrical segments, most homes are connected to the output of a single transformer and accordingly may not have electrically isolated segments. Even when the channels are not electrically coupled to one another, they may still influence each other through inductive coupling or other physical phenomena. As a result, when a transmitter is transmitting on an active channel, the associated "noise" may make simultaneous communication on the other channels impractical, especially when the channels are all communicating on the same frequency bands. As a result, the PLC network 110 may be coordinated such that only one transmitter associated with the channels 132, 134, or 136 may be transmitting at a given time. However, a plurality or even all of the channels may be simultaneously active, given that the transmissions over different active channels do not overlap.

Active PLC channels can also influence PLC devices of other networks or non-PLC devices that are sufficiently close to be influenced by the active PLC channels. Further, during PLC communication, the electrical wiring used for the PLC channels 132, 134, 136 may inadvertently serve as an antenna and raise the noise floor for wireless communication devices, especially at the frequencies used for PLC communication. All of these other devices may benefit from lower PLC noise emissions. When determining the impact of these emissions, it may be worthwhile to measure emissions when transmission power levels are maximal instead of as a simple time average. This is because other systems may often need to be capable of handling the worst-case noise scenario in order to ensure their own respective communications, and these other systems are not generally able to synchronize or coordinate with the PLC network 110.

A network coordination processor 121 may implement a control strategy to reduce noise emissions and potentially reduce energy consumption associated with the PLC network 110. In the embodiment of FIG. 1, the network coordination processor 121 may be implemented as an element of the access point 120. The network coordination processor 121 may either be separate from or closely integrated with the access point's PLC modem 129. In other embodiments, the network coordination processor 121 may be implemented within any of the other PLC nodes 122, 124, and 126, within a separate device in communication with the PLC network 110, or any combination thereof.

Figure 3:
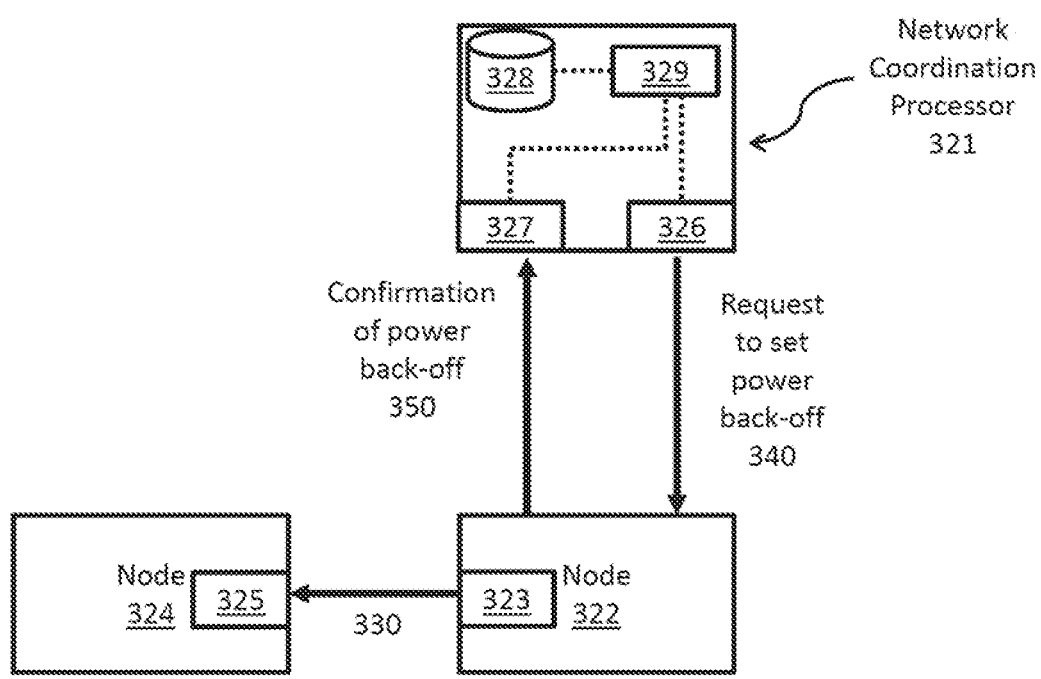
FIG. 3 shows a block diagram illustrating a power back-off command sequence.
Figure 4:
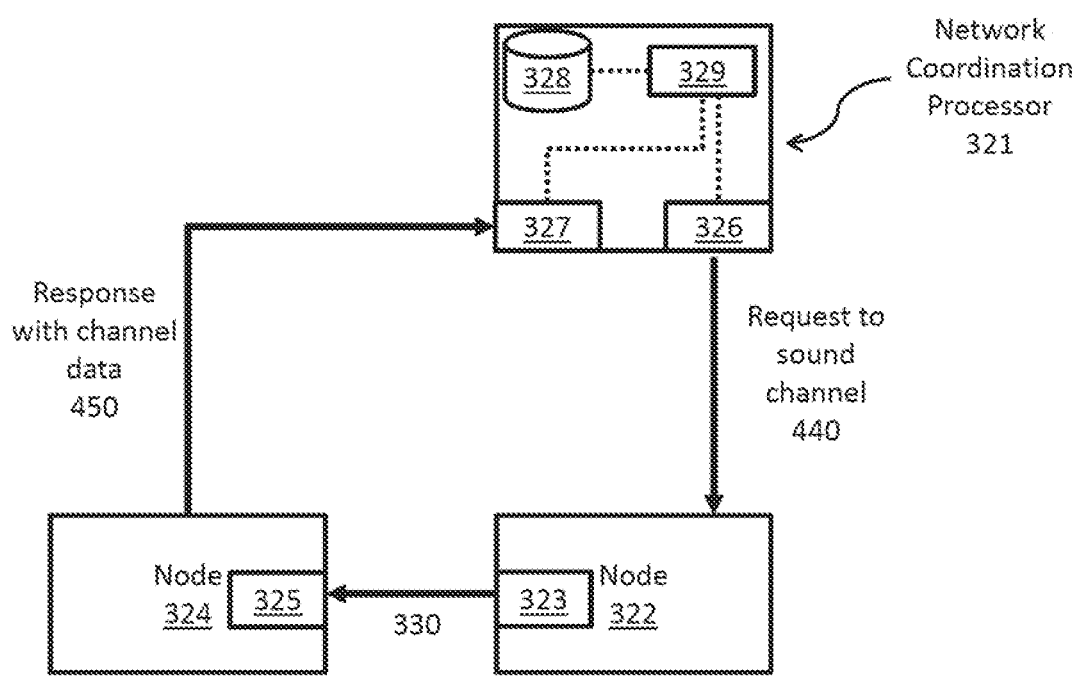
FIG. 4 shows a block diagram illustrating a sound channel command sequence.
Figure 5:
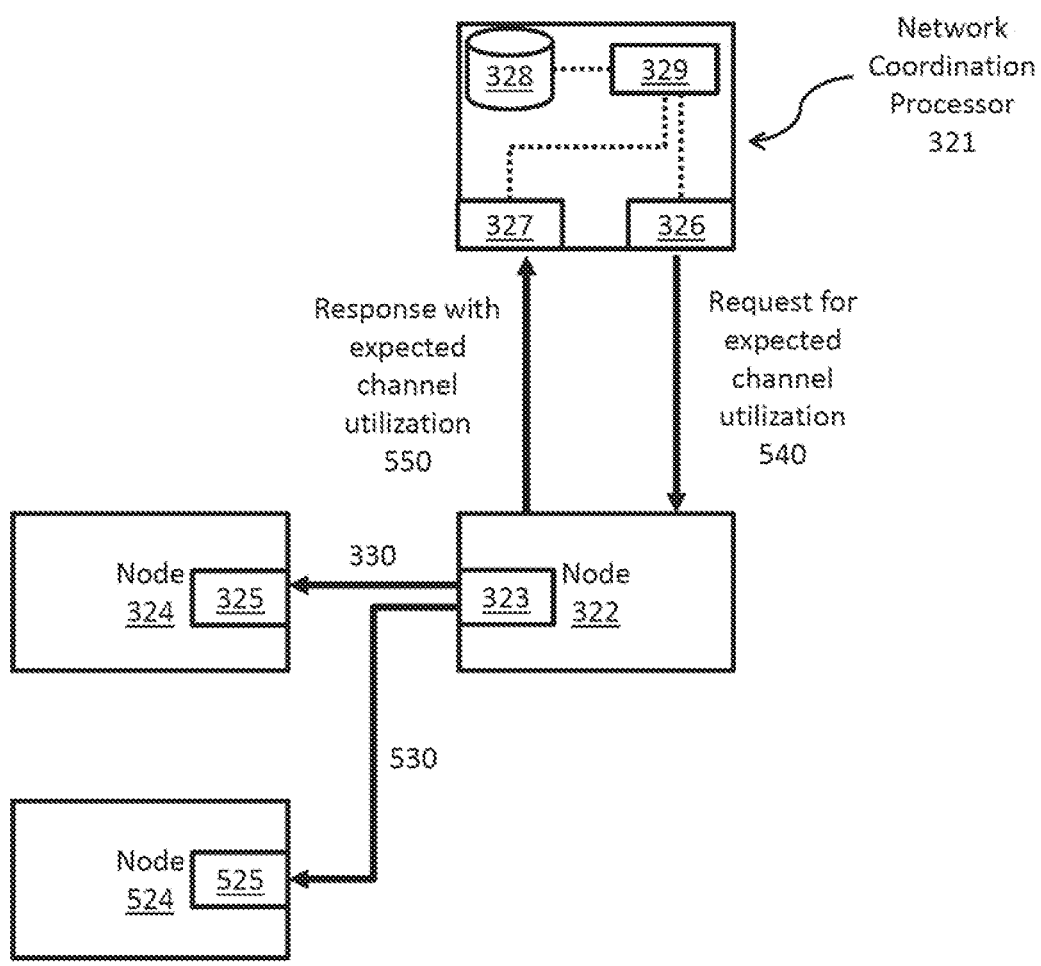
FIG. 5 shows a block diagram illustrating a channel utilization query sequence.

The network coordination processor 121 may issue commands to any of the connected PLC devices or nodes, as will be shown in FIGS. 3-5. These commands may, for example, set transmission power levels of a node, check available link capacity at a node, and sound a channel to determine the bandwidth of a link at a given transmission power level. The network coordination processor 121 may receive and store information about the nodes and channels within the PLC network 110 in a memory device 128 that may be internal to the network coordination processor 121 and/or external to the network coordination processor 121. The memory device 128 may also store instructions which may be executed by the network coordination processor 121 to perform the functions described herein.

In some embodiments, the network coordination processor 121 may coordinate the transmissions between different nodes using time division multiple access (TDMA), such that each node may reserve portions of a fixed-length transmission period to transmit over the transmission medium. For example, the network coordination processor 121 may periodically transmit (e.g., through the PLC modem 129 coupled to the channels 132, 134, 136) a synchronization pulse to the nodes, and each node may reserve a portion of time between synchronization pulses during which time they may transmit. For example, if a video streaming node becomes active, it may reserve a 30% portion of the transmission periods following each synchronization pulse. Another node may seize the channel following each video streaming period and utilize another 10% portion of the transmission period for file transfer, and so on. When a node deactivates (e.g., stops transmitting), it may surrender its reserved portion of the transmission period. Additionally or alternatively, the network coordination processor 121 may also revoke the reserved portions of the transmission periods and reallocate them to other nodes. Further, the length of the reserved portions may be increased or decreased depending on a target network utilization, as will be described further below.

The disclosed principles apply to a wide spectrum of range of media access control mechanisms. Even when these mechanisms allow for less regimented or synchronized communication (e.g., carrier sense multiple access with collision avoidance), the network coordination processor 121 may establish rules to limit the network utilization or transmission duty cycle (e.g., the maximum percentage of time transmitting on the transmission medium) of the individual nodes.

The network coordination processor 121 may comprise a network utilization module (shown in FIGS. 3-5 and described further below) for determining a target network utilization upon which to base control decisions. The target network utilization may be measured as the percentage of time that the PLC nodes are communicating on the transmission medium (e.g., the PLC channels 132, 134, and 136). As discussed above, each PLC node may communicate on the transmission medium at different times from the other PLC nodes, and so the target network utilization may be calculated as the sum of the network utilizations (e.g., transmission duty cycle) of each PLC node. The target network utilization may not exceed 100%, as 100% represents full capacity. The network utilization module may store the target network utilization in a memory device upon determining or recalculating the target network utilization.

The target network utilization may be based upon a variety of factors including Quality of Service (QoS) requirements, which may also be stored in the memory device. The QoS requirements may be associated with the entire PLC network 110, a specific node within the PLC network 110, or even a specific link or channel between two or more nodes within the PLC network 110. Network QoS requirements may be used to represent the network's awareness of current traffic compared to the expectation of future traffic. For example, a network coordination processor may recognize that a PLC network regularly carries high priority video traffic for a few hours each day. During a time when the PLC network is not carrying video traffic, the network QoS requirement may be high to promote availability of capacity, should it be needed. When the video traffic begins flowing over the PLC network, less bandwidth may be reserved for new links and traffic. Accordingly, the network QoS requirement may be reduced. The network QoS requirements may be established using present and historic data.

As described above, individual nodes may also have QoS requirements. For example, if a node is a networked media player that receives video traffic (e.g., the video streaming device 122), the node may have a high QoS requirement to provide an acceptable viewing experience. The network coordination processor 121 may prioritize traffic coming to and from the node(s) with high QoS requirements.

Also as described above, link QoS requirements may be used to characterize links between two or more nodes in a PLC network. For example, if the personal computer 126 is transmitting data to the television 150 through the video streaming device 122, the corresponding link or links (e.g., channels 132 and 136) between the personal computer 126 and the video streaming device 122 may likely carry video traffic, and prompt delivery of the traffic may be important. As a result, the link or links may have high QoS requirements. However, a link between the personal computer 126 and a network storage device may be used for file transfer, which may require less precision in the timing or even the order of packet transmission and delivery. In this case, the link between the personal computer and the network storage device may be classified with lower QoS requirements, such as best-effort delivery. As a result, the utilization and bandwidth of this link may be reduced as needed to accommodate traffic on other links with higher QoS requirements on the PLC network.

QoS requirements may also be established at a higher layer, such as by applications running on the nodes. Different applications may have different priority levels that may be used to prioritize the traffic from these applications. For example, traffic from real-time voice or video applications may be given higher priority than traffic from passive applications (e.g., appliance telemetry) that have more flexibility in the timing of data transmissions. HomePlug protocols support four priority levels for application traffic.

In general, the target network utilization may vary inversely with any combination of the network, node, link, and application QoS requirements described above. For example, in a network generally associated with relatively high network QoS requirements (e.g., as indicated by tracked historical data), the target network utilization may be set relatively low so that new devices may more easily join the network 110 and seize the transmission medium as needed. Similarly, high node and/or link QoS requirements, may decrease the target network utilization so that existing nodes and/or links may seize the transmission medium more readily (e.g., with less risk of contention).

The network coordination processor 121 may limit or back-off transmission power of the active nodes to levels that are sufficient for achieving a suitable bandwidth. This reduction in transmission power may reduce peak transmission power and noise emissions that affect other systems such as wireless networks. Further, many transmitters have reduced linearity when transmitting at the upper bound of their transmission power. For example, high-frequency ringing may be inadvertently produced when transmitting at full power, which may result in even greater noise emissions. Linearity may be improved by reducing transmission power in accordance with the disclosed principles. As a result, high-frequency ringing may also be reduced, which synergistically further decreases noise emissions.

Each link (e.g., channels 132, 134, and 136) may be analyzed to establish a relationship between transmission power and available capacity or bandwidth (bits per second of transmitting on the channel). When transmission power is reduced, the available bandwidth may also decrease. In response, nodes that decrease their transmission power may increase the percentage of time that they transmit on a channel (e.g., their network utilization) to maintain suitable data rates for the applications running on the nodes.

The total energy that a device consumes to make a transmission is determined by the instantaneous rate of power multiplied by the duration of time spent transmitting. Accordingly, the energy saved by reducing transmission power levels may be at least partially offset by the increased transmission time. When the decrease in transmission power is sufficiently large compared to the increase in transmission time, the total energy required to transmit a given frame of data may decrease. Accordingly, the power efficiency of the PLC devices, at least associated with transmission, may be beneficially improved in some scenarios.

The power back-off strategy may be implemented when the total network utilization is sufficiently below the target network utilization, indicating that there is sufficient capacity on the medium to increase transmission times of a given node.

Various HomePlug protocols (e.g., HomePlug Green PHY, HomePlug AV, and HomePlug AV2) define a robust OFDM mode (ROBO mode) which transmits across a wide range of frequencies to provide low data rates with high reliability. Multiple subcarrier frequencies may be used to provide redundancy and thus provide the high reliability.

When ROBO mode is used, the transmission power may generally be reduced in accordance with the disclosed principles without decreasing the data rate or increasing the network utilization (e.g., time spent transmitting on the medium). Accordingly, power savings may generally be achieved for ROBO mode transmissions.

The network coordination processor 121 may also measure and store historical data to anticipate PLC network demand. For example, the network coordination processor 121 may keep track of transmission activities by the nodes (e.g., the devices 120, 122, 124, and 126) and on the links (e.g., channels 132, 134, and 136) within the system 100. This historical data may then be used to calculate the likelihoods of each node and/or channel becoming active.

The historical data may be captured in a series of metrics. The metrics may be associated with individual nodes (e.g., the personal computer 126), individual links (e.g., the channel 136), or the network as a whole. Node-level metrics may comprise characteristics of traffic being transmitted and received by a node. For example, the data rates, average latency, and jitter characteristics may all be stored as node-level metrics. The data rate, latency, and jitter characteristics may additionally or alternatively be captured by link-level metrics. Further, the network coordination processor 121 may determine metrics of the minimum, maximum, and average transmission power levels for each node. The minimum and maximum power levels may be useful for the network coordination processor 121 to determine the boundaries by which it may adjust the transmission power levels of each node. The current transmission power levels may also be stored as node-level metrics, as this information may be valuable in establishing the instantaneous state of the system. Alternatively or additionally, the power back-off levels of each node may be stored. This provides the advantage of allowing the network coordination processor 121 to more quickly determine if additional or less power back-off is possible for each node. Any or all of these metrics may supplement or be alternatives for values that are explicitly and directly provided by the nodes. For example, if a node is aware of its jitter requirements and/or transmission capabilities, the node may directly provide this information to the network coordination processor 121.

At a link level and as will be described further below, the network coordination processor 121 may analyze and calculate the channel capacity (or available bandwidth) of each link as a function of the transmission power level. At a network level, metrics may be established for the total number of nodes within the network as well as the number of active nodes.

In some embodiments, the network coordination processor 121 stores the usage history of links and nodes in a time-contextual manner, so that traffic demand predictions may incorporate the time of day, time of year, or other chronological factors. In some embodiments, recent data may be weighed more heavily than older data to promote alignment with a user's dynamic schedule. Further, the user may directly configure the network coordination processor 121 by manually providing expected PLC network demand information.

Figure 2:
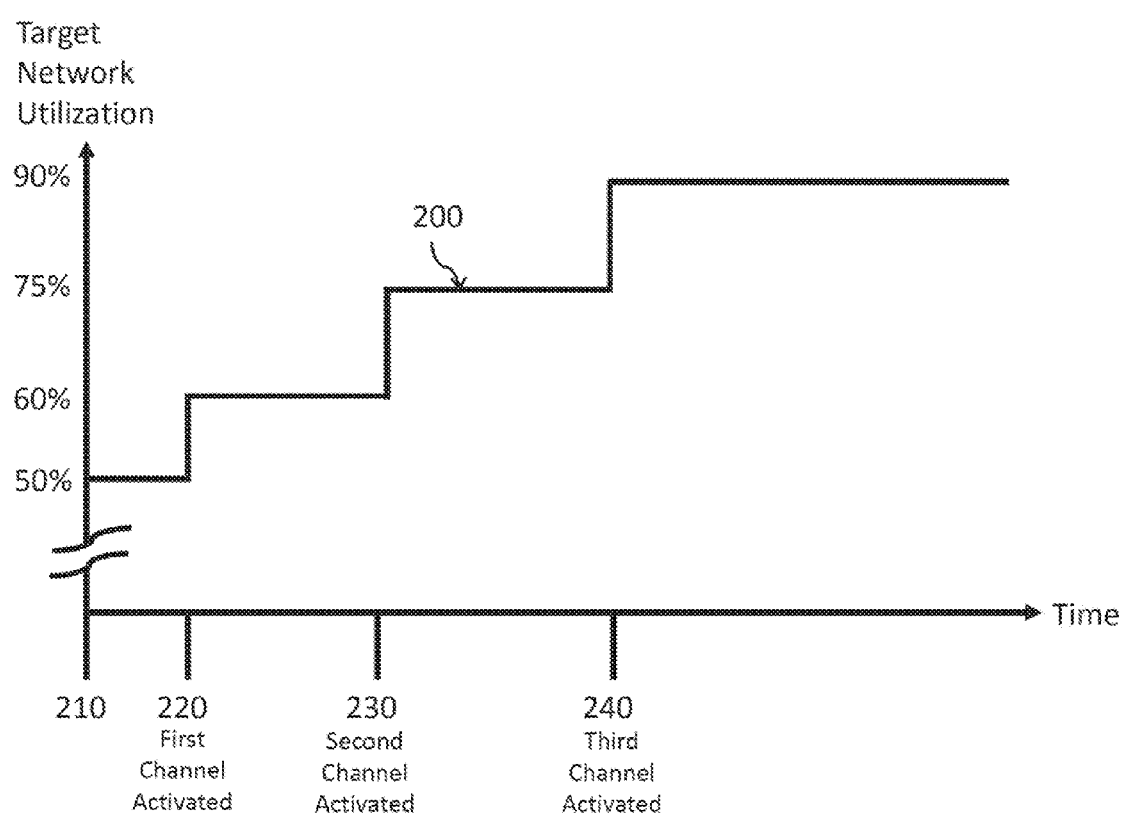
FIG. 2 shows a graph illustrating a target network utilization changing dynamically over time to promote efficient usage of a transmission medium.

FIG. 2 shows a graph illustrating a target network utilization changing dynamically over time to promote efficient usage of a transmission medium. Time is measured on the horizontal axis and the target network utilization is measured on the vertical axis. The dataset 200 of FIG. 2 corresponds to the changing of the target network utilization based on a sequence of events that take place in the PLC network 110 of FIG. 1. All values presented in this scenario are for exemplary purposes only and are not intended to limit the scope of the inventive concepts in any manner. Tables 1 and 2, below, correspond to the scenario described in FIG. 2.

TABLE 1

|  | First Channel | Second Channel | Third Channel |
| --- | --- | --- | --- |
| Description of end points | Access Point to Personal Computer | Access Point to Range Extender | Access Point to Video Streaming Device |
| Channel capacity at full power | 50 Mbps | 40 Mbps | 200 Mbps |
| Application bandwidth | 5 Mbps for Gaming 15 Mbps for Data | 5 Mbps | 20 Mbps |
| QoS requirements | High for Gaming Low for Data | Low | High |

Tables 1 shows the capabilities and configurations of a first channel (channel 136 of FIG. 1), a second channel (channel 134 of FIG. 1), and a third channel (channel 132 of FIG. 1). The table includes a description that matches the descriptions provided with respect to FIG. 1, as well as exemplary channel capacity, application bandwidth, and QoS requirements. This information may be stored in a memory device (e.g., the memory device 128 of FIG. 1) that is in communication with the network coordination processor.

TABLE 2

| Power Back-off Level | First Channel | Second Channel | Third Channel |
| --- | --- | --- | --- |
| 0 dB (Full power) | 50 Mbps | 40 Mbps | 200 Mbps |
| −3 dB | 40 Mbps | 30 Mbps | 150 Mbps |
| −6 dB | 20 Mbps | 20 Mbps | 100 Mbps |
| −9 dB | 10 Mbps | 5 Mbps | 50 Mbps |

Table 2 shows a relationship between power back-off levels and available channel capacity. The information shown in the table may be collected through a series of sounding commands, as described in FIG. 4, at each of the available power back-off levels. Further, the information may be periodically recompiled to account for time-varying factors. This information may be stored (e.g., as a look-up table) in a memory device in communication with the network coordination processor, and it may be used to make effective power back-off decisions to reduce transmission power and noise emissions.

Referring to FIG. 2, during an initial time 210, all of the channels may be inactive, and the network coordination processor may set a target network utilization of 50%. This provides a goal for the percentage of time that transmitters on the channels are transmitting and thus the percentage of time that the shared communication medium providing the channels is utilized. The value of 50% may be chosen based on historical usage data, QoS requirements, and other factors. In some embodiments, the initial target network utilization may be higher or lower than 50%.

At a later time 220, the first channel may become active such that the personal computer may be used for a gaming application. As shown in Table 1, the gaming application requires 5 Mbps, and the channel capacity between the personal computer and the access point when transmitting at full power is 50 Mbps. The utilization of a channel may be calculated as a division of the application bandwidth (e.g., 5 Mbps) by the channel capacity (e.g., 50 Mbps). Accordingly, the transmitter on the first channel (e.g., transmitters of the access point and/or the personal computer) may transmit for 10% of the time if the transmitters are at full power. As a result, the shared communication medium is utilized for 10% of the time, and other transmitters may be prevented from transmitting during this utilized time.

At this stage, the first channel is the only active channel and has a utilization of 10%, and so the total network utilization is also 10%. The network coordination processor may determine the total network utilization using the network utilization module that also determines the target network utilization. As the total network utilization is less than the target network utilization of 50%, the network coordination processor may issue a power back-off command to the transmitters on the first channel, so that the transmission power is reduced. The command may contain a new power level or an incremental change from the power level presently being used (e.g., −6 dB). In the presently described scenario, the decreased power level may reduce the channel capacity from 50 Mbps to 20 Mbps. As a result, the network utilization of the first channel and the total network utilization both increase from 10% to 25%. While this is still below the target network utilization, the network coordination processor may choose not to further decrease the transmission power associated with the first channel.

In some embodiments the relationship of transmission power levels (or back-off levels) to link capacity is known, so that the actual network utilization can more quickly and accurately reflect the total network utilization. In some embodiments, the transmission power levels are adjusted in an iterative process so that the actual network utilization may arrive at or closer to the target network utilization.

The network coordination processor may track and remember historically used channels, which may include the first channel. Given that one of these "known" channels is now active, there would be less motivation to reserve time on the transmission medium for new channels that are presently idle or inactive. Accordingly, the target network utilization may be updated upon the new activity at the time 220 to reflect the new state of the powerline communication network. For example, in the present scenario, the target network utilization may be increased from 50% to 60%.

At a later time 230, the second channel may become active, so that the range extender may be used to provide extended connectivity (e.g., to mobile devices outside the range of the access point). As shown in Table 1, the channel capacity between the range extender and the access point is 40 Mbps when the respective transmitters are transmitting at full power. The expected application bandwidth is 5 Mbps leading to an initial network utilization of 12.5%.

As previously described, the network utilizations of the first and second channels can be summed to determine a total network utilization, which in this case would be 37.5%. As this is lower than the target network utilization of 60%, the network coordination processor may issue a back-off command to the transmitters associated with the second channel to reduce transmission power, e.g., by 6 dB. As a result, the capacity of the second channel may decrease from 40 Mbps to 20 Mbps, and the corresponding network utilization may increase from 12.5% to 25%. When also taking into account the 25% network utilization of the first channel, the total network utilization may be calculated as 50%. While this is less than the target network utilization of 60%, the network coordination processor may choose to not further decrease transmission power levels. In some embodiments where the network coordination processor stores relationships between transmission power levels and network utilizations of each channel, the network coordination processor may determine that any incremental decrease may cause the total network utilization to exceed the target network utilization, which may be non-ideal and so no further power back-off commands would be issued.

Given that an additional channel is now active, there would be less motivation to reserve time on the transmission medium for new channels. Accordingly, the target network utilization may be updated at the time 230 to reflect the new state of the powerline communication network. For example, in the present scenario, the target network utilization may be increased from 60% to 75%.

At a later time 240, the third channel may become active, such that the access point may communicate with the video streaming device. As shown in Table 1, the third channel may have a capacity of 200 Mbps with transmission at full power. The access point may output video data on the channel at 20 Mbps to provide acceptable quality at the end device (e.g., a television connected to the video streaming device). As a result, the initial network utilization by the third channel may be 10%, leading to a total network utilization of 60%.

As total network utilization of 60% is less than the target network utilization of 75%, the network coordination processor may determine a strategy for further decreasing transmission power. The network coordination processor may start by reducing the transmission power associated with the newly activated third channel by 6 dB, which may decrease the capacity from 200 Mbps to 100 Mbps. As a result, the network utilization of the channel may increase from 10% to 20%, which when aggregated with the network utilizations of the other channels leads to a total network utilization of 70%.

Upon the three channels all being active, the network coordination processor may use historical data to determine that no additional known channels may become activated. Accordingly, it may increase the target network utilization to 90%, which optionally leaves excess capacity of 10% for unknown or atypical channels to become active. The excess capacity may be increased or decreased based on user configuration, historical data, or other factors.

As all known channels are currently active at this stage and the actual network utilization of 70% is still less than the target network utilization of 90%, the network coordination processor may further coordinate transmission power levels to increase the actual network utilization. The network coordination processor may reduce the increment level by 3 dB in order to provide finer granularity in power control. Then, using the stored relationships between link capacity and transmission power, the network coordination processor may determine which channel(s) are best suitable for further transmission power back-off. The relationships may, for example, be stored in memory as a lookup table, as shown in Table 2 above.

A further reduction of 3 dB for the first channel may decrease the channel capacity of the first channel from 20 Mbps to 10 Mbps. This would increase the associated network utilization to 50% and the total network utilization to 95% which is above the target network utilization. Accordingly, the network controller may decide not to implement further power back-off on the first channel.

A further reduction of 3 dB for the second channel may reduce the channel capacity from 20 Mbps to 5 Mbps. This drastic reduction in channel capacity may result if the signal level is already fairly close to the noise floor in the transmission channel. If the channel capacity were reduced to 5 Mbps, the network utilization for the second channel may increase to a 100% (as the bandwidth used is also 5 Mbps) and the total network utilization would be 145%, which is unachievable. Accordingly, the network controller may decide not to implement further power back-off on the second channel.

A further reduction of 3 dB for the third channel may reduce the channel capacity from 100 Mbps to 50 Mbps, which may increase the network utilization by the third channel to 40%, and the total network utilization may become 90%, which meets the criteria of being the below or equal to the total network utilization of 90%. Accordingly, the network coordination processor may choose to implement the 3 dB power back-off for the third channel.

As described in the above scenario, the network coordination processor may effectively take advantage of times where the PLC network has lower utilization (e.g., when the communication medium is uncontested for a relatively larger period of time) by requesting the active nodes to decrease their power levels. As a result, the active nodes may spend more time transmitting on the communication medium while decreasing the transmission power, and thus noise emissions. External devices not directly associated with the PLC network (e.g., wireless communication devices or PLC devices in other PLC networks) are primarily affected by the peak noise emissions and are less affected by the "duty cycle" of the noise emissions. Accordingly, the disclosed techniques provide better coexistence with external systems.

While the first, second, and third channels are shown as being sequentially brought online, any number of PLC channels may be activated and deactivated in any order based on a variety of factors such as user interaction, configuration settings, and scheduling. In some embodiments, the network coordination processor may target low QoS channels more aggressively than high QoS channels for transmission power back-off.

In some embodiments, minimum utilization thresholds and/or maximum power back-off thresholds are implemented so that individual nodes cannot spend excessive amounts of time on the transmission medium, even if no other node is concurrently active. These thresholds may be checked before the network coordination processor decides to increase power back-off.

Occasionally, a channel's capacity may change significantly over a short period of time. Such events may occur when additional devices are plugged in or out of the electrical network, or if a noise source is suddenly added or removed. If capacity suddenly increases, the actual utilization may decrease, which may not cause immediate concerns. In some embodiments, the network coordination processor may recognize that the increased capacity leads to the actual utilization being below the target network utilization and may request additional power back-off to further decrease noise emissions.

When a channel's capacity suddenly decreases, however, the actual utilization may temporarily exceed the target utilization. If the actual utilization remains below 100%, no severe disruption of service should occur, and the network coordination processor may be able to readjust (e.g., increase) the transmission power at the nodes of the affected channel (or other nodes) to bring the actual utilization below or equal to the target utilization.

If the actual network utilization exceeds 100%, the network coordination processor may implement an aggressive strategy to increase transmission power wherever possible to bring the actual utilization below 100% and ideally below the target network utilization. If all nodes are transmitting at full power, a temporary disruption may be unavoidable. In this scenario, the network coordination processor may iteratively select and temporarily deactivate channels or nodes having the lowest QoS requirements, until the actual utilization is brought within acceptable levels.

FIG. 3 shows a block diagram illustrating a power back-off command sequence. As shown in the figure, a first node 322 may be in communication with a second node 324 over a channel 330. The first node 322 may have a transmitter 323 that sends data by modulating the channel 330 in a manner limited by a transmission power level. The data may be received by a receiver 325 of the second node 324. In some embodiments, the first node 322 may begin periodically transmitting messages using a default transmission power level. The default transmission power level may be the level previously set by the network coordination processor 321 or it may be the full or highest transmission power level.

The network coordination processor 321 may comprise a transmitter 326, a receiver 327, a memory device 328 and a network utilization module 329. The transmitter 326 may be used by the network coordination processor 321 to send commands and queries to nodes such as the first node 322. The receiver 327 may receive confirmation of the implementation of commands as well as the results of queries. The memory device 328 may store status information on nodes (e.g., nodes 322 and 324) and channels (e.g., channel 330) within the network. The memory device 328 may also store instructions which may be executed by the network coordination processor 321 to perform the functions described herein. Finally, the network utilization module 329 may determine a target network utilization and an actual (e.g., realized) network utilization and store this data in the memory device 328.

While the network coordination processor 321 is shown to comprise four components, fewer or more components may be implemented. Further, the components may be closely integrated with one another. For example, the receiver 327 and the transmitter 326 may be combined to form a transceiver having a unified analog front end.

The network coordination processor 321 may determine that the transmission power level may be changed (e.g., after comparing the target network utilization to the actual network utilization). To implement this change, the network coordination processor 321 may send a request message 340 to the first node 322 using the transmitter 326. The request message 340 may set a power back-off level for the transmitter 323 of the first node 322.

In some embodiments, the request message 340 may comprise instructions establishing an absolute power back-off level, which may be subtracted from the full or maximum transmission power level to result in the transmission power level for the transmitter 323. By establishing an absolute power back-off level, the request message 340 may be processed independent of the previous transmission power back-off level. In other embodiments, the request message 340 may comprise instructions to change the transmission power level (or power back-off level) relative to the level presently being held.

Upon setting the power back-off level of the transmitter 323, the node 322 may send a confirmation message 350 back to the network coordination processor 321, which may be received by the receiver 327 of the network coordination processor 321. The network coordination processor 321 may then store the new power back-off level in the memory device 328. This completes the power back-off command sequence.

In some embodiments, power back-off requests may be individually issued to each node having a transmitter on a channel, whereas in other embodiments, a single power back-off request affects all nodes communicating on a channel.

FIG. 4 shows a block diagram illustrating a sound channel command sequence. Certain elements of FIG. 4 are also in FIG. 3, and a description of these elements will not be repeated as their operation in the embodiment of FIG. 4 will be the same or similar.

The network coordination processor 321 may determine and store channel information associated with each link in the memory device 328. For example, if the channel comprises a plurality of orthogonal frequency division multiplexing (OFDM) carriers, the channel information may comprise the capacity of each OFDM carrier as well as the total channel capacity that may be equal to the sum of the individual carrier capacities. This channel information may vary for each channel, and it may also vary over time due to external influences and changes in the system topology. Accordingly, the network coordination processor 321 may wish to periodically or systematically have channels sounded to maintain accurate data.

The network coordination processor 321 may issue a sound channel request message 440 to the first node 322 to determine channel information (e.g., bandwidth or capacity) of the channel 330 at a given transmission power level. Accordingly, the sound channel request message 440 may contain instructions for setting the power level of the transmitter 323 for the sounding process. Upon receiving the sound channel request message 440, the first node 322 may set the transmission level of the transmitter 323 to the level instructed by the message 440, and the first node 322 may then sound the channel 330 using a known test waveform expected by the second node 324 and/or other techniques known in the art. The second node 324 may determine channel information by analyzing the waveform received by the receiver 325 and comparing it to the known test waveform. The compiled channel information (e.g., how much channel capacity is available at the selected transmission power level) may be sent back to the network coordination processor 321 by the second node 324 via a response message 450.

In some embodiments, the first node 322 may automatically sound the channel over a range of available power levels upon receiving the sound channel request message 440. Accordingly, the second node 324 may provide a response message 450 to the network coordination processor 321 with multiple sets of channel information corresponding to the range of transmission power levels used by the transmitter 324.

The network coordination processor 321 may issue sound channel requests during times when the related channels are not being used. The network coordination processor 321 may establish a schedule for periodically sounding channels using multiple transmission power levels. The network coordination processor 321 may also issue sound channel commands when a new channel is established and before the new channel is utilized for normal traffic.

In some scenarios, the channel 330 from the first node 322 to the second node 324 may have different characteristics than the reverse channel from the second node 324 to the first node 322. For example, local noise at either node 322 or 324 may disproportionally affect transmissions in one direction over the other direction. Accordingly, the network coordination processor 321 may issue a separate channel sounding sequence to characterize the reverse channel from the second node 324 to the first node 322.

FIG. 5 shows a block diagram illustrating a channel utilization query sequence. Certain elements of FIG. 5 are also in FIGS. 3 and 4, and a description of these elements will not be repeated as their operation in the embodiment of FIG. 5 will be the same or similar.

The network coordination processor 321 may determine and store the expected channel utilization of channels leading into or out of each node using the network utilization module 329 and the memory device 328. For example, a video streaming node may require 20 Mbps of capacity on channels ending on the video streaming node during normal operation. This information may be useful to the network coordination processor 321 when making power back-off decisions and setting target network utilization. For example, the network coordination processor 321 may set a relatively low target network utilization if it recognizes that a currently inactive node will likely require significant channel bandwidth (e.g., which may increase network utilization by 30%) in the near future.

The channel utilization query sequence begins with the network coordination processor 321 sending a request message 540 to the first node 322 for expected channel utilization information.

In this example, the first node 322 transmits data on the channel 330 to the receiver 325 of the second node 324, and the first node 322 also transmits data on another channel 530 to a receiver 525 of a third node 524. The first node 322 may determine the maximum expected utilization over all channels involving the first node 322, which may be the sum of the expected utilizations on the channels 330 and 530. While the channels 330 and 530 are shown as unidirectional, the channels may alternatively be bi-directional and the first node 322 may factor received data as well as the capacities of the channels 330 and 530 in both directions when determining the expected utilization. The first node 322 may report the expected utilization of channels involving the node 322 to the coordinating mode using a response message 550. The response message 550 may also contain other details such as the Quality of Service (QoS) requirements associated with the channels 330 and 530 and/or the first node 322.

In some embodiments, nodes may have a plurality of applications or modes that have varying utilization requirements. For example, as described in FIG. 1, a personal computer may have a gaming mode with an expected utilization and a second, data transfer mode with a different expected utilization. When a node has a plurality of modes and expected utilizations, it may convey all of the modes and expected utilizations to the network controller 321.

The command and query messages of FIGS. 3-5 may be sent over the powerline infrastructure much like other powerline communication traffic. The commands and query messages may be sent using full transmission power on any unknown or uncharacterized channels to increase likelihood of successful delivery.

Figure 6:
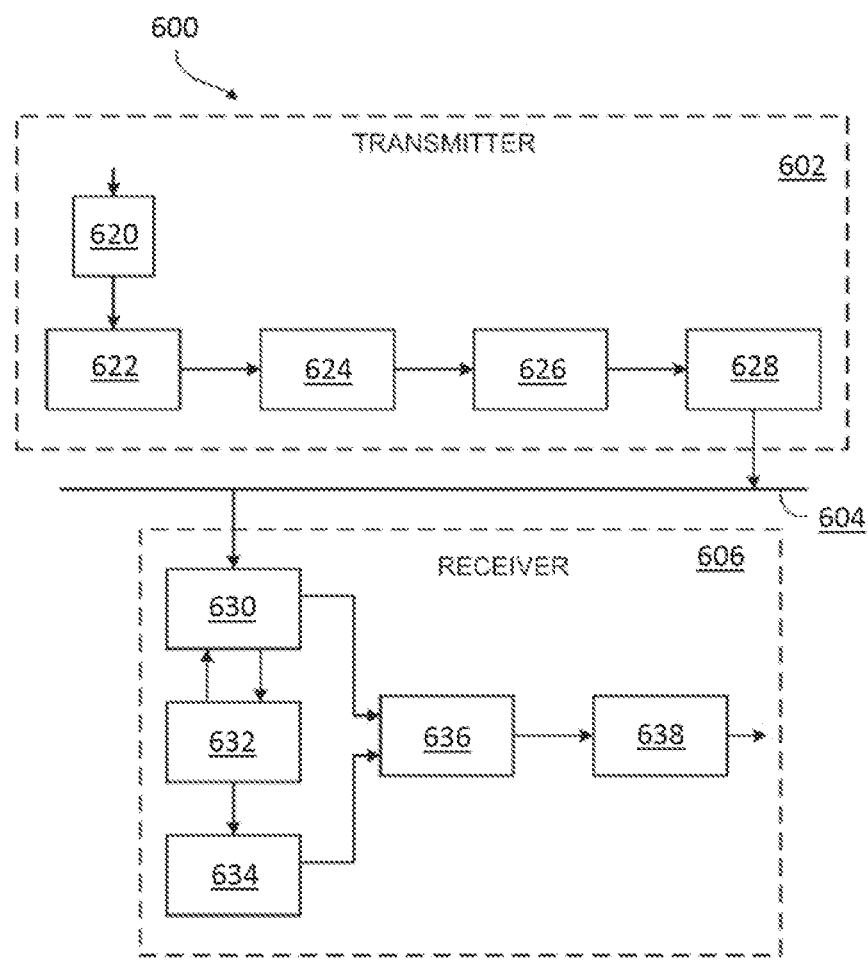
FIG. 6 shows a block diagram illustrating a communication system for communicating over a network.

FIG. 6 shows a block diagram illustrating a communication system 600 for communicating over a network. Within the communication system 600, a transmitter 602 may transmit a signal (e.g., a sequence of OFDM symbols) over a communication medium 604 to a receiver 606. The transmitter 602 and receiver 606 may both be incorporated into any of the nodes of a PLC network, as were described above. The communication medium 604 may represent a path or channel from one node to another over the powerline infrastructure.

At the transmitter 602, modules implementing the physical layer receive a MAC protocol data unit (MPDU) from the MAC layer. The MAC protocol data unit is sent to an encoder module 620 to perform processing such as scrambling, error correction coding, and interleaving.

The encoded data is fed into a mapping module 622 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the in-phase component and whose imaginary part corresponds to the quadrature-phase component of a carrier with a peak frequency, $f_i$. Alternatively, any appropriate modulation scheme that associates data values to modulated carrier waveforms can be used.

The mapping module 622 also determines which of the carrier frequencies $f_1, \ldots, f_N$ within the OFDM bandwidth are used by the system 600 to transmit information. For example, some carriers that are experiencing fades can be avoided, and no information is transmitted on those carriers. Instead, the mapping module 622 uses coherent BPSK modulated with a binary value from the Pseudo Noise (PN) sequence for that carrier. For some carriers (e.g., a carrier i=10) that correspond to restricted bands (e.g., an amateur radio band) on the medium 604 that may radiate power, substantially no energy may be transmitted on those carriers (e.g., by setting $A_{10} = 0$). The mapping module 622 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 624 performs the modulation of the resulting set of N complex numbers (some of which may be zero for unused carriers)

determined by the mapping module 622 onto N orthogonal carrier waveforms having peak frequencies $f_1, \ldots, f_N$. The modulated carriers are combined by the IDFT module 624 to form a discrete time symbol waveform S(n) (for a sampling rate $f_R$), which can be written as $$S(n) = 10 \sum_{i=1}^{N} A_i \exp[j(2\pi n/N + \Phi_i)] \qquad \text{Eq. (1)}$$

where the time index n goes from 1 to N, $A_i$ is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 626 combines a sequence of consecutive (potentially overlapping) symbols into a "symbol set" that can be transmitted as a continuous block over the communication medium 604. The post-processing module 626 prepends a preamble to the symbol set that can be used for automatic gain control (AGC) and symbol timing synchronization. To mitigate intersymbol and intercarrier interference (e.g., due to imperfections in the system 600 and/or the communication medium 604) the post-processing module 626 can extend each symbol with a cyclic prefix that is a copy of the last part of the symbol. The post-processing module 626 can also perform other functions such as applying a pulse shaping window to subsets of symbols within the symbol set (e.g., using a raised cosine window or other type of pulse shaping window) and overlapping the symbol subsets.

An analog front end (AFE) module 628 couples an analog signal containing a continuous-time (e.g., low-pass filtered) version of the symbol set to the communication medium 604. The effect of the transmission of the continuous-time version of the waveform S(t) over the communication medium 604 can be represented by convolution with a function g(τ;t) representing an impulse response of transmission over the communication medium. The communication medium 604 may add noise n(t), which may be random noise and/or narrowband noise emitted by a jammer.

At the receiver 606, modules implementing the physical layer receive a signal from the communication medium 604 and generate a MAC protocol data unit for the MAC layer. An AFE module 630 operates in conjunction with an automatic gain control (AGC) module 632 and a time synchronization module 634 to provide sampled signal data and timing information to a discrete Fourier transform (DFT) module 636.

After removing the cyclic prefix, the receiver 606 feeds the sampled discrete-time symbols into DFT module 636 to extract the sequence of N complex numbers representing the encoded data values (by performing an N-point DFT). A demodulator/decoder module 638 maps the complex numbers onto the corresponding bit sequences and performs the appropriate decoding of the bits (including de-interleaving and descrambling).

Any of the modules of the communication system 600 including modules in the transmitter 602 or receiver 606 can be implemented in hardware, software, or a combination of hardware and software. Where a module is implemented, at least in part, in software, the software may be stored in a non-volatile, machine-readable medium.

While the communication medium has generally been described as a powerline infrastructure, home networking systems may also use the phone lines or coaxial cables inside the house as a communication medium. In some cases, there could be variation in signal attenuation and noise characteristics between various pairs of nodes. In such cases, home network systems may use channel adaptation procedures that enable selection of unique physical layer encoding parameters (e.g., modulation rate and forward error correction code rate) between a given pair of nodes. This approach enables optimization of the physical data rate that can be achieved between the pair of nodes according to current channel characteristics.

In some implementations, the channel characteristics depend on an attenuation (and distortion) of the signal as it propagates from the transmission to the receiver. The channel characteristics may also depend on noise within the network. The combined effect of signal attenuation (and distortion) and noise may determine the channel capacity that may be achieved between a pair of nodes. As described above, higher channel capacity allows for more data intensive applications to be supported and/or for lower noise emissions by allowing decreased transmission power. The channel characteristics may also determine quality of a channel or how reliably information is transmitted across the channel. Indicators and measures of quality may include, for example, bit error rate (BER) or symbol error rate (SER). In general, a low quality channel is prone to distorting the messages it conveys while a high quality channel preserves the integrity of the messages it conveys. In some implementations, the quality of the channel in use between communicating entities governs the probability of the destination correctly receiving the message from the source.

While various embodiments in accordance with the disclosed principles have been described above, it should be understood that they have been presented by way of example only, and are not limiting. Thus, the breadth and scope of the disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It is contemplated that the receivers, transmitters, and other elements be provided according to the structures disclosed herein in integrated circuits of any type to which their use commends them, such as ROMs, RAM (random access memory) such as DRAM (dynamic RAM), and video RAM (VRAM), PROMs (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, to general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as digital signal processors (DSP), graphics system processors (GSP), synchronous vector processors (SVP), image system processors (ISP), as well as testability and emulation circuitry for them, all represent sites of application of the principles and structures disclosed herein.

Implementation is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

Various terms used in the present disclosure have special meanings within the present technical field. Whether a particular term should be construed as such a "term of art" depends on the context in which that term is used. "Connected to," "in communication with," "associated with," or other similar terms should generally be construed broadly to include situations both where communications and connections are direct between referenced elements or through one or more intermediaries between the referenced elements. These and other terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "immediately," "equivalent," "during," "complete," "identical," and the like should be understood to mean "substantially at the time," "substantially immediately," "substantially equivalent," "substantially during," "substantially complete," "substantially identical," etc., where "substantially" means that such comparisons, measurements, and timings are practicable to accomplish the implicitly or expressly stated desired result. Additionally, the section headings herein are provided for consistency with the suggestions under 37 C.F.R. 1.77 or otherwise to provide organizational cues. These headings shall not limit or characterize the subject matter set forth in any claims that may issue from this disclosure. Specifically and by way of example, although the headings refer to a "Field of the Disclosure," such claims should not be limited by the language chosen under this heading to describe the so-called technical field. Further, a description of a technology in the "Background" is not to be construed as an admission that technology is prior art to any subject matter in this disclosure. Neither is the "Summary" to be considered as a characterization of the subject matter set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A network coordination processor sharing a communication medium with a first node, the first node operable to transmit data on the communication medium at a transmission power level, the network coordination processor comprising:
   a transmitter operable to send a request message to the first node, the request message instructing the first node to adjust the transmission power level;
   a memory device operable to store a Quality of Service (QoS) requirement;
   a network utilization module operable to determine a target network utilization based, at least in part, on the QoS requirement stored in the memory device, the network utilization module further operable to determine an actual network utilization,
   wherein the network coordination processor is operable to instruct the first node to reduce the transmission power level during a time when the actual network utilization is determined to be less than the target network utilization.

2. The network coordination processor of claim 1:
   wherein the actual network utilization represents a percentage of time that the communication medium is utilized; and
   wherein reducing the transmission power level causes the first node to transmit for longer periods of time and the actual network utilization to increase to a level that is still less than or equal to the target network utilization.

3. The network coordination processor of claim 1, wherein the network coordination processor determines the target network utilization based, at least in part, on historical data.

4. The network coordination processor of claim 3, wherein the network utilization module determines the target network utilization based, at least in part, on at least one node-level metric selected from the group comprising a data rate, average latency, and jitter characteristics associated with the first node.

5. The network coordination processor of claim 3, wherein the network utilization module determines the target network utilization based, at least in part, on a number of known nodes and a number of currently active nodes.

6. The network coordination processor of claim 1, wherein the network utilization module determines the target network utilization based, at least in part, on user configuration.

7. The network coordination processor of claim 1, wherein the network utilization module increases the target network utilization upon determining that a second node becomes active on the communication medium.

8. The network coordination processor of claim 1, wherein the QoS requirement stored in the memory device corresponds to the data transmitted by the first node.

9. The network coordination processor of claim 1, wherein the QoS requirement corresponds to the communication medium.

10. The network coordination processor of claim 1, wherein the network coordination processor is integrated into an access point operable to provide external data to the first node over the communication medium.

11. A method of reducing noise emissions of a powerline communication system comprising a first node transmitting data to a second node over a communication medium using a transmission power level, the method comprising:
   determining, by a network coordination processor in communication with the first node, a target network utilization based, at least in part, on a Quality of Service (QoS) requirement;
   determining, by the network coordination processor, an actual network utilization; and
   reducing, by the network coordination processor, the transmission power level during a time when the actual network utilization is less than the target network utilization.

12. The method of claim 11:
   wherein the actual network utilization represents a percentage of time that the communication medium is utilized; and wherein reducing the transmission power level causes the first node to transmit for longer periods of time and the actual network utilization to increase to a level that is still less than or equal to the target network utilization.

13. The method of claim 11, wherein the network coordination processor determines the target network utilization based, at least in part, on historical data.

14. The method of claim 13, wherein the network coordination processor determines the target network utilization based, at least in part, on at least one node-level metric selected from the group comprising a data rate, average latency, and jitter characteristics associated with the first node.

15. The method of claim 13, wherein the network coordination processor determines the target network utilization based, at least in part, on a number of known nodes and a number of currently active nodes.

16. The method of claim 11, wherein the network coordination processor determines the target network utilization based, at least in part, on user configuration.

17. The method of claim 11, further comprising:
increasing, by the network coordination processor, the target network utilization upon determining that a third node becomes active on the communication medium.

18. The method of claim 11, wherein the QoS requirement corresponds to the data transmitted by the first node.

19. The method of claim 11, wherein the QoS requirement corresponds to the communication medium.

20. The method of claim 11, wherein the network coordination processor is integrated into an access point operable to provide external data to the first and second nodes over the communication medium.

21. An access point sharing a communication medium with a first node, the first node transmitting data on the communication medium at a transmission power level, the access point comprising:
a port for communicating with an external network to establish interne connectivity for the access point;
a powerline communication modem coupled to the communication medium;
a network coordination processor in communication with the powerline communication modem, the network coordination processor operable to change the transmission power level used by the first node,
wherein the network coordination processor is further operable to determine a target network utilization based, at least in part, on a Quality of Service (QoS) requirement;
wherein the network coordination processor is further operable to determine an actual network utilization; and
wherein the network coordination processor is further operable to reduce the transmission power level used by the first node during a time when the actual network utilization is less than the target network utilization.

22. The access point of claim 21, wherein the port is operable to communicate using a broadband powerline protocol.

23. The access point of claim 21, further comprising:
a wireless transceiver operable to provide wireless connections to wireless local devices.

24. The access point of claim 21,
wherein the actual network utilization represents a percentage of time that the communication medium is utilized; and
wherein reducing the transmission power level causes the first node to transmit for longer periods of time and the actual network utilization to increase to a level that is still less than or equal to the target network utilization.

25. The access point of claim 21, wherein the network coordination processor determines the target network utilization based, at least in part, on historical data.

26. The access point of claim 25, wherein the network coordination processor determines the target network utilization based, at least in part, on at least one node-level metric selected from the group comprising a data rate, average latency, and jitter characteristics associated with the first node.

27. The access point of claim 25, wherein the network coordination processor determines the target network utilization based, at least in part, on a number of known nodes and a number of currently active nodes.

28. The access point of claim 21, wherein the network coordination processor determines the target network utilization based, at least in part, on user configuration.

29. The access point of claim 21, wherein the network coordination processor increases the target network utilization upon determining that a second node becomes active on the communication medium.

30. The access point of claim 21, wherein the QoS requirement corresponds to the data transmitted by the first node.

* * * * *